(12) United States Patent
Lee et al.

(10) Patent No.: US 12,514,663 B2
(45) Date of Patent: Jan. 6, 2026

(54) CONTROLLER ARRANGEMENTS FOR ROBOTIC SURGICAL SYSTEMS

(71) Applicant: EndoQuest Robotics, Inc., Houston, TX (US)

(72) Inventors: Jeihan Lee, Houston, TX (US); Jiwon Choi, Houston, TX (US); Yongman Park, Houston, TX (US); Dongsuk Shin, Houston, TX (US)

(73) Assignee: EndoQuest Robotics, Inc., Houston, TX (US)

(*) Notice: Subject to any disclaimer, the term of this patent is extended or adjusted under 35 U.S.C. 154(b) by 83 days.

(21) Appl. No.: 18/134,674

(22) Filed: Apr. 14, 2023

(65) Prior Publication Data

US 2023/0248457 A1   Aug. 10, 2023

Related U.S. Application Data

(63) Continuation of application No. PCT/US2022/051261, filed on Nov. 29, 2022.

(60) Provisional application No. 63/284,204, filed on Nov. 30, 2021.

(51) Int. Cl.
*A61B 34/37* (2016.01)
*A61B 34/00* (2016.01)
*A61B 34/30* (2016.01)

(52) U.S. Cl.
CPC .............. *A61B 34/37* (2016.02); *A61B 34/30* (2016.02); *A61B 34/71* (2016.02); *A61B 2034/301* (2016.02)

(58) Field of Classification Search
CPC ......... A61B 34/37; A61B 34/30; A61B 34/71; A61B 2034/301

USPC ............................................................ 606/1
See application file for complete search history.

(56) References Cited

U.S. PATENT DOCUMENTS

| | | | |
|---|---|---|---|
| 5,792,135 A | 8/1998 | Madhani et al. |
| 5,797,900 A | 8/1998 | Madhani et al. |
| 5,836,936 A | 11/1998 | Cuschieri |
| 5,976,122 A | 11/1999 | Madhani et al. |
| 6,063,095 A | 5/2000 | Wang et al. |

(Continued)

FOREIGN PATENT DOCUMENTS

| | | |
|---|---|---|
| CN | 105310775 A | 2/2016 |
| CN | 108309370 A | 7/2018 |

(Continued)

OTHER PUBLICATIONS

"Plenary 1: Colubris MX"—YouTube Video link address https://www.youtube.com/watch?v=in_luQiAZg8 dated Aug. 20, 2020.

(Continued)

*Primary Examiner* — James M Kish
*Assistant Examiner* — Natasha Patel
(74) *Attorney, Agent, or Firm* — Troutman Pepper Locke LLP; Scott D. Wofsy; Michael J. Pollack

(57) ABSTRACT

A controller system for a robotic surgical system can include a first instrument controller comprising a first plurality of motors configured to steer a first attachable robotically controlled medical device, a second instrument controller comprising a second plurality of motors configured to steer a second attachable robotically controlled medical device, and a camera controller comprising a plurality of motors and configured to steer an attachable robotically controlled endoscopic camera.

6 Claims, 9 Drawing Sheets

(56) References Cited

U.S. PATENT DOCUMENTS

| | | |
|---|---|---|
| 6,132,368 A | 10/2000 | Cooper |
| 6,162,239 A | 12/2000 | Manhes |
| 6,244,809 B1 | 6/2001 | Wang et al. |
| 6,246,200 B1 | 6/2001 | Blumenkranz et al. |
| 6,312,435 B1 | 11/2001 | Wallace et al. |
| 6,331,181 B1 | 12/2001 | Tierney et al. |
| 6,346,072 B1 | 2/2002 | Cooper |
| 6,364,888 B1 | 4/2002 | Niemeyer et al. |
| 6,371,952 B1 | 4/2002 | Madhani et al. |
| 6,394,998 B1 | 5/2002 | Wallace et al. |
| 6,402,715 B2 | 6/2002 | Manhes |
| 6,424,885 B1 | 7/2002 | Niemeyer et al. |
| 6,441,577 B2 | 8/2002 | Blumenkranz et al. |
| 6,451,027 B1 | 9/2002 | Cooper et al. |
| 6,491,691 B1 | 12/2002 | Morley et al. |
| 6,491,701 B2 | 12/2002 | Tierney et al. |
| 6,493,608 B1 | 12/2002 | Niemeyer |
| 6,508,827 B1 | 1/2003 | Manhes |
| 6,522,906 B1 | 2/2003 | Salisbury, Jr. et al. |
| 6,565,554 B1 | 5/2003 | Niemeyer |
| 6,587,750 B2 | 7/2003 | Gerbi et al. |
| 6,645,196 B1 | 11/2003 | Nixon et al. |
| 6,671,581 B2 | 12/2003 | Niemeyer et al. |
| 6,676,684 B1 | 1/2004 | Morley et al. |
| 6,684,129 B2 | 1/2004 | Salisbury, Jr. et al. |
| 6,699,177 B1 | 3/2004 | Wang et al. |
| 6,699,235 B2 | 3/2004 | Wallace et al. |
| 6,714,839 B2 | 3/2004 | Salisbury, Jr. et al. |
| 6,746,443 B1 | 6/2004 | Morley et al. |
| 6,766,204 B2 | 7/2004 | Niemeyer et al. |
| 6,783,524 B2 | 8/2004 | Anderson et al. |
| 6,785,593 B2 | 8/2004 | Wang et al. |
| 6,799,088 B2 | 9/2004 | Wang et al. |
| 6,817,972 B2 | 11/2004 | Snow |
| 6,817,974 B2 | 11/2004 | Cooper et al. |
| 6,836,703 B2 | 12/2004 | Wang et al. |
| 6,837,846 B2 | 1/2005 | Jaffe et al. |
| 6,840,938 B1 | 1/2005 | Morley et al. |
| 6,852,107 B2 | 2/2005 | Wang et al. |
| 6,866,671 B2 | 3/2005 | Tierney et al. |
| 6,871,117 B2 | 3/2005 | Wang et al. |
| 6,892,112 B2 | 5/2005 | Wang et al. |
| 6,905,491 B1 | 6/2005 | Wang et al. |
| 6,951,535 B2 | 10/2005 | Ghodoussi et al. |
| 6,991,627 B2 | 1/2006 | Madhani et al. |
| 6,994,703 B2 | 2/2006 | Wang et al. |
| 7,025,064 B2 | 4/2006 | Wang et al. |
| 7,027,892 B2 | 4/2006 | Wang et al. |
| 7,048,745 B2 | 5/2006 | Tierney et al. |
| 7,066,926 B2 | 6/2006 | Wallace et al. |
| 7,074,179 B2 | 7/2006 | Wang et al. |
| 7,083,571 B2 | 8/2006 | Wang et al. |
| 7,087,049 B2 | 8/2006 | Nowlin et al. |
| 7,090,637 B2 | 8/2006 | Danitz et al. |
| 7,118,582 B1 | 10/2006 | Wang et al. |
| 7,125,403 B2 | 10/2006 | Julian et al. |
| 7,155,315 B2 | 12/2006 | Niemeyer et al. |
| 7,204,844 B2 | 4/2007 | Jensen et al. |
| 7,276,065 B2 | 10/2007 | Morley et al. |
| 7,320,700 B2 | 1/2008 | Cooper et al. |
| 7,326,228 B2 | 2/2008 | Cuschieri et al. |
| 7,331,967 B2 | 2/2008 | Lee et al. |
| 7,333,642 B2 | 2/2008 | Green |
| 7,357,774 B2 | 4/2008 | Cooper |
| 7,398,707 B2 | 7/2008 | Morley et al. |
| 7,524,320 B2 | 4/2009 | Tierney et al. |
| 7,553,277 B2 | 6/2009 | Hoefig et al. |
| 7,574,250 B2 | 8/2009 | Niemeyer |
| 7,608,083 B2 | 10/2009 | Lee et al. |
| 7,615,066 B2 | 11/2009 | Danitz et al. |
| 7,691,098 B2 | 4/2010 | Wallace et al. |
| 7,744,608 B2 | 6/2010 | Lee et al. |
| 7,756,036 B2 | 7/2010 | Druke et al. |
| 7,757,028 B2 | 7/2010 | Druke et al. |
| 7,763,015 B2 | 7/2010 | Cooper et al. |
| 7,780,651 B2 | 8/2010 | Madhani et al. |
| 7,837,674 B2 | 11/2010 | Cooper |
| 7,854,738 B2 | 12/2010 | Lee et al. |
| 7,865,266 B2 | 1/2011 | Moll et al. |
| 7,955,322 B2 | 6/2011 | Devengenzo et al. |
| 7,967,746 B2 | 6/2011 | Leroy et al. |
| 8,052,636 B2 | 11/2011 | Moll et al. |
| 8,054,752 B2 | 11/2011 | Druke et al. |
| 8,068,649 B2 | 11/2011 | Green |
| 8,075,474 B2 | 12/2011 | Honda et al. |
| 8,100,133 B2 | 1/2012 | Mintz et al. |
| 8,120,301 B2 | 2/2012 | Goldberg et al. |
| 8,123,740 B2 | 2/2012 | Madhani et al. |
| 8,147,503 B2 | 4/2012 | Zhao et al. |
| 8,169,468 B2 | 5/2012 | Scott et al. |
| 8,182,415 B2 | 5/2012 | Larkin et al. |
| 8,190,238 B2 | 5/2012 | Moll et al. |
| 8,228,368 B2 | 7/2012 | Zhao et al. |
| 8,323,297 B2 | 12/2012 | Hinman et al. |
| 8,335,590 B2 | 12/2012 | Costa et al. |
| 8,337,521 B2 | 12/2012 | Cooper et al. |
| 8,343,045 B2 | 1/2013 | Swinehart et al. |
| 8,343,141 B2 | 1/2013 | Madhani et al. |
| 8,365,633 B2 | 2/2013 | Simaan et al. |
| 8,375,808 B2 | 2/2013 | Blumenkranz et al. |
| 8,398,541 B2 | 3/2013 | DiMaio et al. |
| 8,437,629 B2 | 5/2013 | McDowall |
| 8,469,947 B2 | 6/2013 | Devengenzo et al. |
| 8,475,366 B2 | 7/2013 | Boulais et al. |
| 8,506,555 B2 | 8/2013 | Ruiz Morales |
| 8,591,399 B2 | 11/2013 | Marescaux et al. |
| 8,594,841 B2 | 11/2013 | Zhao et al. |
| 8,597,280 B2 | 12/2013 | Cooper et al. |
| 8,600,551 B2 | 12/2013 | Itkowitz et al. |
| 8,617,102 B2 | 12/2013 | Moll et al. |
| 8,644,988 B2 | 2/2014 | Prisco et al. |
| 8,679,099 B2 | 3/2014 | Cooper et al. |
| 8,690,908 B2 | 4/2014 | Cooper et al. |
| 8,709,000 B2 | 4/2014 | Madhani et al. |
| 8,740,885 B2 | 6/2014 | Larkin et al. |
| 8,784,435 B2 | 7/2014 | Cooper et al. |
| 8,786,241 B2 | 7/2014 | Nowlin et al. |
| 8,790,243 B2 | 7/2014 | Cooper et al. |
| 8,801,661 B2 | 8/2014 | Moll et al. |
| 8,810,631 B2 | 8/2014 | Scott et al. |
| 8,816,628 B2 | 8/2014 | Nowlin et al. |
| 8,821,480 B2 | 9/2014 | Burbank |
| 8,831,782 B2 | 9/2014 | Itkowitz |
| 8,838,270 B2 | 9/2014 | Druke et al. |
| 8,852,208 B2 | 10/2014 | Gomez et al. |
| 8,878,920 B2 | 11/2014 | Ovod |
| 8,887,595 B2 | 11/2014 | Williams |
| 8,888,690 B2 | 11/2014 | Swinehart et al. |
| 8,888,764 B2 | 11/2014 | Devengenzo et al. |
| 8,903,549 B2 | 12/2014 | Itkowitz et al. |
| 8,918,207 B2 | 12/2014 | Prisco |
| 8,944,070 B2 | 2/2015 | Guthart et al. |
| 8,945,095 B2 | 2/2015 | Blumenkranz et al. |
| 8,998,797 B2 | 4/2015 | Omori |
| 9,011,318 B2 | 4/2015 | Choset et al. |
| 9,050,120 B2 | 6/2015 | Swarup et al. |
| 9,060,678 B2 | 6/2015 | Larkin et al. |
| 9,089,354 B2 | 7/2015 | Simaan et al. |
| 9,095,362 B2 | 8/2015 | Dachs, II et al. |
| 9,107,572 B2 | 8/2015 | Marescaux et al. |
| 9,138,284 B2 | 9/2015 | Krom et al. |
| 9,144,456 B2 | 9/2015 | Rosa et al. |
| 9,173,548 B2 | 11/2015 | Omori |
| 9,179,979 B2 | 11/2015 | Jinno |
| 9,186,221 B2 | 11/2015 | Burbank |
| 9,254,090 B2 | 2/2016 | Watson et al. |
| 9,259,274 B2 | 2/2016 | Prisco |
| 9,259,276 B2 | 2/2016 | Mintz et al. |
| 9,301,807 B2 | 4/2016 | Duval |
| 9,308,937 B2 | 4/2016 | Griffiths et al. |
| 9,339,341 B2 | 5/2016 | Cooper |
| 9,358,074 B2 | 6/2016 | Schena et al. |
| 9,433,342 B2 | 9/2016 | Perretta et al. |
| 9,456,839 B2 | 10/2016 | Cooper |

(56) References Cited

U.S. PATENT DOCUMENTS

| | | | |
|---|---|---|---|
| 9,486,288 B2 | 11/2016 | Devengenzo et al. |
| 9,498,242 B2 | 11/2016 | Crews et al. |
| 9,504,517 B2 | 11/2016 | Rosa et al. |
| 9,510,915 B2 | 12/2016 | Madhani et al. |
| 9,531,699 B2 | 12/2016 | Panchura et al. |
| 9,554,827 B2 | 1/2017 | Omori |
| 9,565,990 B2 | 2/2017 | Lee et al. |
| 9,596,980 B2 | 3/2017 | Marescaux et al. |
| 9,687,310 B2 | 6/2017 | Nowlin et al. |
| 9,717,486 B2 | 8/2017 | Cooper et al. |
| 9,757,149 B2 | 9/2017 | Cooper et al. |
| 9,757,203 B2 | 9/2017 | Hourtash et al. |
| 9,775,678 B2 | 10/2017 | Lohmeier |
| 9,782,056 B2 | 10/2017 | McDowall |
| 9,782,225 B2 | 10/2017 | Lohmeier et al. |
| 9,795,446 B2 | 10/2017 | DiMaio et al. |
| 9,795,453 B2 | 10/2017 | Tierney et al. |
| 9,801,526 B2 | 10/2017 | Larkin et al. |
| 9,801,654 B2 | 10/2017 | Gomez et al. |
| 9,814,527 B2 | 11/2017 | Rogers et al. |
| 9,867,603 B2 | 1/2018 | Merz et al. |
| 9,877,794 B2 | 1/2018 | Csiky |
| 9,901,402 B2 | 2/2018 | Itkowitz et al. |
| 9,918,659 B2 | 3/2018 | Chopra et al. |
| 9,949,620 B2 | 4/2018 | Duval et al. |
| 9,962,066 B2 | 5/2018 | Rogers et al. |
| 9,968,405 B2 | 5/2018 | Cooper et al. |
| 9,980,630 B2 | 5/2018 | Larkin et al. |
| 10,010,331 B2 | 7/2018 | Morash |
| 10,039,473 B2 | 8/2018 | Zhao et al. |
| 10,058,390 B2 | 8/2018 | Simaan et al. |
| 10,085,788 B2 | 10/2018 | Privitera et al. |
| 10,085,806 B2 | 10/2018 | Hagn et al. |
| 10,092,172 B2 | 10/2018 | Peh et al. |
| 10,105,128 B2 | 10/2018 | Cooper et al. |
| 10,117,715 B2 | 11/2018 | Lohmeier et al. |
| 10,159,536 B2 | 12/2018 | Kralicky et al. |
| 10,178,368 B2 | 1/2019 | Zhao et al. |
| 10,179,024 B2 | 1/2019 | Yeung |
| 10,179,413 B2 | 1/2019 | Rockrohr |
| 10,188,472 B2 | 1/2019 | Diolaiti et al. |
| 10,258,421 B2 | 4/2019 | Lohmeier et al. |
| 10,278,782 B2 | 5/2019 | Jarc et al. |
| 10,321,964 B2 | 6/2019 | Grover et al. |
| 10,327,856 B2 | 6/2019 | Kralicky et al. |
| 10,363,107 B2 | 7/2019 | Blumenkranz et al. |
| 10,365,295 B2 | 7/2019 | Blumenkranz et al. |
| 10,390,687 B2 | 8/2019 | Choi et al. |
| 10,390,895 B2 | 8/2019 | Henderson et al. |
| 10,391,635 B2 | 8/2019 | Berghofer et al. |
| 10,398,520 B2 | 9/2019 | Larkin et al. |
| 10,413,370 B2 | 9/2019 | Yates et al. |
| 10,448,813 B2 | 10/2019 | Cooper et al. |
| 10,456,166 B2 | 10/2019 | Cooper et al. |
| 10,507,068 B2 | 12/2019 | Kopp et al. |
| 10,512,481 B2 | 12/2019 | Cooper |
| 10,524,644 B2 | 1/2020 | Scott et al. |
| 10,524,868 B2 | 1/2020 | Cooper et al. |
| 10,531,929 B2 | 1/2020 | Widenhouse et al. |
| 10,602,958 B2 | 3/2020 | Silverstein et al. |
| 10,646,990 B2 | 5/2020 | Olds et al. |
| 10,660,713 B2 | 5/2020 | McCrea et al. |
| 10,682,193 B2 | 6/2020 | Choi et al. |
| 10,729,503 B2 | 8/2020 | Cameron |
| 10,736,702 B2 | 8/2020 | Harris et al. |
| 10,779,896 B2 | 9/2020 | Dachs et al. |
| 10,779,899 B2 | 9/2020 | Griffiths et al. |
| 10,786,329 B2 | 9/2020 | Schuh et al. |
| 10,820,953 B2 | 11/2020 | Kralicky et al. |
| 10,828,115 B2 | 11/2020 | Koenig et al. |
| 10,828,117 B2 | 11/2020 | Evans |
| 10,835,331 B2 | 11/2020 | Burbank |
| 10,835,335 B2 | 11/2020 | Perdue et al. |
| 10,856,946 B2 | 12/2020 | Solomon et al. |
| 10,864,051 B2 | 12/2020 | Simi et al. |
| 10,874,475 B2 | 12/2020 | Iceman |
| 10,881,422 B2 | 1/2021 | Kim et al. |
| 10,898,189 B2 | 1/2021 | McDonald, II |
| 10,898,281 B2 | 1/2021 | Cooper et al. |
| 10,905,505 B1 | 2/2021 | Barakat et al. |
| 10,918,449 B2 | 2/2021 | Solomon et al. |
| 10,939,970 B2 | 3/2021 | Laakso et al. |
| 10,959,607 B2 | 3/2021 | Rogers et al. |
| 11,607,283 B2 * | 3/2023 | Penny .................. A61B 34/76 |
| 11,690,647 B2 * | 7/2023 | Yeung ................ A61B 17/3423 606/1 |
| 2002/0161281 A1 | 10/2002 | Jaffe et al. |
| 2003/0036748 A1 | 2/2003 | Cooper et al. |
| 2003/0083673 A1 | 5/2003 | Tierney et al. |
| 2003/0114962 A1 | 6/2003 | Niemeyer |
| 2003/0135203 A1 | 7/2003 | Wang et al. |
| 2004/0049205 A1 | 3/2004 | Lee et al. |
| 2004/0138700 A1 | 7/2004 | Cooper et al. |
| 2004/0162547 A1 | 8/2004 | Wallace et al. |
| 2004/0236316 A1 | 11/2004 | Danitz et al. |
| 2005/0043718 A1 | 2/2005 | Madhani et al. |
| 2005/0059960 A1 | 3/2005 | Simaan et al. |
| 2005/0149003 A1 | 7/2005 | Tierney et al. |
| 2005/0200324 A1 | 9/2005 | Guthart et al. |
| 2005/0204851 A1 | 9/2005 | Morley et al. |
| 2005/0216033 A1 | 9/2005 | Lee et al. |
| 2005/0251112 A1 | 11/2005 | Danitz et al. |
| 2006/0152516 A1 | 7/2006 | Plummer |
| 2006/0167440 A1 | 7/2006 | Cooper et al. |
| 2007/0043338 A1 | 2/2007 | Moll et al. |
| 2007/0137372 A1 | 6/2007 | Devengenzo et al. |
| 2007/0151390 A1 | 7/2007 | Blumenkranz et al. |
| 2007/0156119 A1 | 7/2007 | Wallace et al. |
| 2007/0156122 A1 | 7/2007 | Cooper |
| 2007/0197896 A1 | 8/2007 | Moll et al. |
| 2007/0244515 A1 | 10/2007 | Fanous |
| 2008/0065105 A1 | 3/2008 | Larkin et al. |
| 2008/0065107 A1 | 3/2008 | Larkin et al. |
| 2008/0065111 A1 | 3/2008 | Blumenkranz et al. |
| 2008/0071291 A1 | 3/2008 | Duval et al. |
| 2008/0077159 A1 | 3/2008 | Madhani et al. |
| 2008/0177282 A1 | 7/2008 | Lee et al. |
| 2008/0177284 A1 | 7/2008 | Lee et al. |
| 2008/0269562 A1 | 10/2008 | Marescaux et al. |
| 2008/0287963 A1 | 11/2008 | Rogers et al. |
| 2009/0023989 A1 | 1/2009 | Honda et al. |
| 2009/0171151 A1 | 7/2009 | Choset et al. |
| 2009/0192519 A1 | 7/2009 | Omori |
| 2010/0011901 A1 | 1/2010 | Burbank |
| 2010/0048999 A1 | 2/2010 | Boulais et al. |
| 2010/0082041 A1 | 4/2010 | Prisco |
| 2010/0234831 A1 | 9/2010 | Hinman et al. |
| 2010/0274087 A1 | 10/2010 | Diolaiti et al. |
| 2010/0292708 A1 | 11/2010 | Madhani et al. |
| 2010/0331856 A1 * | 12/2010 | Carlson .................. A61B 34/37 606/130 |
| 2011/0118755 A1 | 5/2011 | Cooper et al. |
| 2011/0125166 A1 | 5/2011 | Cooper et al. |
| 2011/0144658 A1 | 6/2011 | Wenderow et al. |
| 2011/0152879 A1 | 6/2011 | Williams |
| 2011/0196419 A1 | 8/2011 | Cooper |
| 2011/0277580 A1 | 11/2011 | Cooper et al. |
| 2011/0282351 A1 | 11/2011 | Cooper et al. |
| 2011/0282359 A1 | 11/2011 | Duval |
| 2011/0282491 A1 | 11/2011 | Prisco et al. |
| 2011/0288561 A1 | 11/2011 | Devengenzo et al. |
| 2011/0313449 A1 | 12/2011 | Cooper |
| 2012/0150192 A1 | 6/2012 | Dachs, II et al. |
| 2012/0203271 A1 | 8/2012 | Larkin et al. |
| 2012/0209174 A1 | 8/2012 | Moll et al. |
| 2012/0221011 A1 | 8/2012 | Larkin et al. |
| 2012/0232339 A1 | 9/2012 | Csiky |
| 2013/0053868 A1 | 2/2013 | Cooper et al. |
| 2013/0079794 A9 | 3/2013 | Cooper et al. |
| 2013/0096540 A1 | 4/2013 | Cooper et al. |
| 2013/0110131 A1 | 5/2013 | Madhani et al. |
| 2013/0123800 A1 | 5/2013 | Leroy et al. |
| 2013/0197539 A1 | 8/2013 | Simaan et al. |
| 2013/0197540 A1 | 8/2013 | Simaan et al. |

(56) References Cited

U.S. PATENT DOCUMENTS

| | | |
|---|---|---|
| 2013/0267950 A1 | 10/2013 | Rosa et al. |
| 2013/0267964 A1 | 10/2013 | Rogers et al. |
| 2013/0274761 A1 | 10/2013 | Devengenzo et al. |
| 2014/0005555 A1* | 1/2014 | Tesar .................... A61B 50/15 600/476 |
| 2014/0081292 A1 | 3/2014 | Moll et al. |
| 2014/0194899 A1 | 7/2014 | Madhani et al. |
| 2014/0243852 A1 | 8/2014 | Cooper et al. |
| 2014/0257336 A1 | 9/2014 | Choi et al. |
| 2014/0277106 A1 | 9/2014 | Crews et al. |
| 2014/0296637 A1 | 10/2014 | Lee et al. |
| 2014/0296872 A1 | 10/2014 | Cooper et al. |
| 2015/0066002 A1 | 3/2015 | Cooper et al. |
| 2015/0100066 A1 | 4/2015 | Kostrzewski et al. |
| 2015/0141755 A1* | 5/2015 | Tesar .................... A61B 1/051 600/109 |
| 2015/0150636 A1 | 6/2015 | Hagn et al. |
| 2015/0173726 A1 | 6/2015 | Lohmeier et al. |
| 2015/0173729 A1 | 6/2015 | Lohmeier et al. |
| 2015/0173731 A1 | 6/2015 | Lohmeier et al. |
| 2015/0173840 A1 | 6/2015 | Lohmeier |
| 2015/0238267 A1 | 8/2015 | Devengenzo et al. |
| 2015/0250546 A1 | 9/2015 | Larkin et al. |
| 2016/0015447 A1 | 1/2016 | Rosa et al. |
| 2016/0058512 A1 | 3/2016 | Gomez et al. |
| 2016/0066773 A1 | 3/2016 | Cooper et al. |
| 2016/0242860 A1 | 8/2016 | Diolaiti et al. |
| 2016/0256183 A1 | 9/2016 | Cooper |
| 2017/0014197 A1 | 1/2017 | McCrea et al. |
| 2017/0020615 A1 | 1/2017 | Koenig et al. |
| 2017/0071628 A1 | 3/2017 | Cooper et al. |
| 2017/0112505 A1 | 4/2017 | Morash |
| 2017/0156804 A1 | 6/2017 | Cooper et al. |
| 2017/0265923 A1 | 9/2017 | Privitera et al. |
| 2017/0273749 A1 | 9/2017 | Grover et al. |
| 2017/0274533 A1 | 9/2017 | Berghofer et al. |
| 2017/0281296 A1 | 10/2017 | Cooper et al. |
| 2017/0312043 A1 | 11/2017 | Ogawa et al. |
| 2017/0325879 A1 | 11/2017 | Yeung |
| 2017/0354318 A1 | 12/2017 | Rogers et al. |
| 2017/0367775 A1 | 12/2017 | Dachs, II et al. |
| 2017/0367777 A1 | 12/2017 | Kralicky et al. |
| 2018/0000318 A9 | 1/2018 | Rogers et al. |
| 2018/0000548 A1 | 1/2018 | Olds et al. |
| 2018/0014852 A1 | 1/2018 | Gomez et al. |
| 2018/0049820 A1 | 2/2018 | Widenhouse et al. |
| 2018/0049822 A1 | 2/2018 | Henderson et al. |
| 2018/0049827 A1 | 2/2018 | Harris et al. |
| 2018/0064498 A1 | 3/2018 | Kapadia et al. |
| 2018/0111273 A1 | 4/2018 | Linnell et al. |
| 2018/0132956 A1 | 5/2018 | Cameron |
| 2018/0168747 A1 | 6/2018 | Kopp et al. |
| 2018/0168752 A1 | 6/2018 | Scheib et al. |
| 2018/0193007 A1 | 7/2018 | Au et al. |
| 2018/0200894 A1 | 7/2018 | Rockrohr |
| 2018/0214176 A1 | 8/2018 | Solomon et al. |
| 2018/0221096 A1 | 8/2018 | Yates et al. |
| 2018/0242824 A1 | 8/2018 | Larkin et al. |
| 2018/0256270 A1 | 9/2018 | Cooper et al. |
| 2018/0271607 A1 | 9/2018 | Kralicky et al. |
| 2018/0271616 A1 | 9/2018 | Schuh et al. |
| 2018/0286287 A1 | 10/2018 | Razzaque |
| 2018/0296299 A1 | 10/2018 | Iceman |
| 2018/0317915 A1 | 11/2018 | Mcdonald, II |
| 2018/0318023 A1 | 11/2018 | Griffiths et al. |
| 2018/0353204 A1 | 12/2018 | Solomon et al. |
| 2018/0370045 A1 | 12/2018 | Kan |
| 2019/0039241 A1 | 2/2019 | Langenfeld et al. |
| 2019/0090965 A1* | 3/2019 | Farritor ................ A61B 34/30 |
| 2019/0117247 A1 | 4/2019 | Kim et al. |
| 2019/0125467 A1 | 5/2019 | Evans |
| 2019/0216551 A1 | 7/2019 | Burbank |
| 2019/0269472 A1 | 9/2019 | Kralicky et al. |
| 2019/0274769 A1 | 9/2019 | Perdue et al. |
| 2019/0314645 A1 | 10/2019 | Ciresianu et al. |
| 2019/0328472 A1 | 10/2019 | Tojo et al. |
| 2019/0380801 A1 | 12/2019 | Savall et al. |
| 2020/0038123 A1 | 2/2020 | Graetzel et al. |
| 2020/0069389 A1 | 3/2020 | Morrissette et al. |
| 2020/0107898 A1 | 4/2020 | Kim et al. |
| 2020/0146763 A1 | 5/2020 | Schena et al. |
| 2020/0179067 A1 | 6/2020 | Ross et al. |
| 2020/0205917 A1 | 7/2020 | Peine et al. |
| 2020/0214774 A1 | 7/2020 | Yoshida et al. |
| 2020/0297444 A1 | 9/2020 | Camarillo et al. |
| 2020/0315645 A1* | 10/2020 | Kim ...................... A61B 17/29 |
| 2020/0330173 A1 | 10/2020 | Kapadia et al. |
| 2020/0367979 A1 | 11/2020 | Laakso et al. |
| 2020/0375682 A1 | 12/2020 | Kincaid et al. |
| 2020/0397456 A1 | 12/2020 | Kim et al. |
| 2020/0397457 A1 | 12/2020 | Kim et al. |
| 2021/0045819 A1 | 2/2021 | Castillo et al. |
| 2021/0228296 A1* | 7/2021 | Dupont .................. A61B 34/71 |
| 2021/0241542 A1 | 8/2021 | Shmayahu et al. |
| 2021/0259794 A1 | 8/2021 | Kato et al. |
| 2021/0267702 A1 | 9/2021 | Kim et al. |
| 2021/0275266 A1 | 9/2021 | Kim et al. |
| 2021/0322045 A1 | 10/2021 | Kim et al. |
| 2021/0322046 A1 | 10/2021 | Kim et al. |
| 2021/0338052 A1 | 11/2021 | Ouyang et al. |
| 2022/0168057 A1* | 6/2022 | Tanaka ............... A61B 1/00149 |
| 2022/0354524 A1 | 11/2022 | Kim et al. |
| 2023/0210618 A1 | 7/2023 | Kim et al. |
| 2023/0210621 A1 | 7/2023 | Noh et al. |
| 2023/0248419 A1 | 8/2023 | Cho et al. |
| 2023/0248450 A1 | 8/2023 | Ravi et al. |
| 2023/0255702 A1 | 8/2023 | Park et al. |
| 2023/0285090 A1 | 9/2023 | Lee et al. |
| 2023/0285098 A1 | 9/2023 | Lee et al. |
| 2023/0285099 A1 | 9/2023 | Lee et al. |
| 2023/0355221 A1 | 11/2023 | Shin et al. |
| 2023/0363842 A1 | 11/2023 | Choi et al. |
| 2023/0363847 A1 | 11/2023 | Lee et al. |
| 2024/0058079 A1 | 2/2024 | Kim et al. |

FOREIGN PATENT DOCUMENTS

| | | | |
|---|---|---|---|
| CN | 109674647 A | 4/2019 | |
| CN | 111770737 A | 10/2020 | |
| CN | 213606867 U | 7/2021 | |
| EP | 2968048 B1 | 6/2018 | |
| EP | 3175813 B1 | 1/2020 | |
| JP | 2019530517 A | 10/2019 | |
| JP | 2020104843 A | 7/2020 | |
| JP | 2021513442 A | 5/2021 | |
| KR | 20110032444 A | 3/2011 | |
| KR | 101943440 B1 | 1/2019 | |
| WO | 2012/035492 A1 | 3/2012 | |
| WO | 2016/109886 A1 | 7/2016 | |
| WO | WO-2019006087 A2 * | 1/2019 | ........... A61B 1/0016 |
| WO | 2019055681 A1 | 3/2019 | |
| WO | 2020243285 A1 | 12/2020 | |
| WO | 2021026231 A1 | 2/2021 | |
| WO | 2021071540 A1 | 4/2021 | |
| WO | 2021080623 A1 | 4/2021 | |
| WO | 2021161162 A1 | 8/2021 | |
| WO | 2021161184 A1 | 8/2021 | |

OTHER PUBLICATIONS

International Search Report and Written Opinion, of the Korean Intellectual Property Office, as ISA, mailed Apr. 6, 2023, in corresponding International Patent Application PCT/US2022/051217.

International Search Report and Written Opinion, of the Korean Intellectual Property Office, as ISA, mailed Apr. 6, 2023, in corresponding International Patent Application PCT/US2022/051220.

International Search Report and Written Opinion, of the Korean Intellectual Property Office, as ISA, mailed Apr. 7, 2023, in corresponding International Patent Application PCT/US2022/051225.

International Search Report and Written Opinion, of the Korean Intellectual Property Office, as ISA, mailed Apr. 6, 2023, in corresponding International Patent Application PCT/US2022/051237.

(56) References Cited

OTHER PUBLICATIONS

International Search Report and Written Opinion, of the Korean Intellectual Property Office, as ISA, mailed Apr. 6, 2023, in corresponding International Patent Application PCT/US2022/051246.
International Search Report and Written Opinion, of the Korean Intellectual Property Office, as ISA, mailed Apr. 6, 2023, in corresponding International Patent Application PCT/US2022/051255.
International Search Report and Written Opinion, of the Korean Intellectual Property Office, as ISA, mailed Apr. 6, 2023, in corresponding International Patent Application PCT/US2022/051259.
International Search Report and Written Opinion, of the Korean Intellectual Property Office, as ISA, mailed Apr. 6, 2023, in corresponding International Patent Application PCT/US2022/051261.
International Search Report and Written Opinion, of the Korean Intellectual Property Office, as ISA, mailed Apr. 14, 2023, in corresponding International Patent Application PCT/US2022/051265.
International Search Report and Written Opinion, of the Korean Intellectual Property Office, as ISA, mailed Apr. 6, 2023, in corresponding International Patent Application PCT/US2022/051262.
Taiwan Intellectual Property Office, Office Action and Search Report issued on Jun. 13, 2023, in corresponding Taiwan Invention Patent Application No. 111145617.

* cited by examiner

CONTROLLER ARRANGEMENTS FOR ROBOTIC SURGICAL SYSTEMS

CROSS-REFERENCE TO RELATED APPLICATIONS

This application is a continuation of International Patent Application No. PCT/US2022/051261 filed Nov. 29, 2022, which claims priority to and the benefit of U.S. Provisional Application No. 63/284,204, filed Nov. 30, 2021, the entire contents of which are herein incorporated by reference in their entirety.

FIELD

This disclosure relates to robotic surgical systems, e.g., for minimally invasive surgery including, but not limited to, endoluminal and single-site surgery.

BACKGROUND

Minimally invasive surgery such as endoluminal and single-site robotic surgery offer significant advantages versus traditional robotic surgery. For example, in endoluminal robotic surgery, no incision need be made to access difficult to access locations within a patient's natural lumen. This dramatically reduces and/or eliminates recovery time and improves procedural safety. A single-site system reduces incisions to a minimum single-site, which reduces an otherwise larger number of incisions to provide access for certain procedures.

Certain endoluminal and single-site robotic surgical systems have been proposed. Examples of such systems and related components can be found in U.S. Pat. No. 10,881,422, as well as U.S. Patent Application Nos. US20210322046, US20210322045, US20190117247, US20210275266, US20210267702, US20200107898, US20200397457, US202000397456, US20200315645, and US201962914226, all of the above being incorporated by reference herein in their entirety.

Conventional surgical robotics and systems have generally been considered satisfactory for their intended purpose. However, there is still a need in the art for improved robotic surgical systems, devices, methods, controls, and components, especially those configured for endoluminal and single-site surgery. The present disclosure provides improvements in such areas, for example.

SUMMARY

In accordance with at least one aspect of this disclosure, a controller system for a robotic surgical system can include a first instrument controller comprising a first plurality of motors configured to steer a first attachable robotically controlled medical device, a second instrument controller comprising a second plurality of motors configured to steer a second attachable robotically controlled medical device, and a camera controller comprising a plurality of motors and configured to steer an attachable robotically controlled endoscopic camera.

The camera controller can include a hub attachment interface to connect to a steering adapter of a robotically controlled endoscopic camera. The camera controller can be positioned above the first and second instrument controller. The camera controller can be positioned symmetrically between the first and second instrument controllers.

The camera controller can include one or more motors. The camera controller can include be configured to provide three degrees-of-freedom (DOF). The three DOF can include two DOF for bending and one DOF for axial translation. The camera controller can include one or more pushing actuators (e.g., only pushing actuators).

In certain embodiments, the system can include the robotically controlled endoscopic camera. The endoscopic camera can include a steering adapter configured to receive pushing actuation of pushing actuators of the camera controller. The steering adapter can be configured to convert pushing actuation from the pushing actuators to pulling actuation to pull steering cables of the robotically controlled endoscopic camera.

In accordance with at least one aspect of this disclosure, a robotic surgical system can include a controller system. The controller system can include any suitable controller system disclosed herein, e.g., as described above.

In accordance with at least one aspect of this disclosure, a non-transitory computer readable medium can include computer executable instruction configured to cause a computer to perform a method. The method can include receiving camera control inputs from a user input device of a robotic surgical system, correlating the camera control inputs to a motor control to provide an associated instrument movement of a medical device, and actuating one or more push motors of a camera controller based with the motor control such that the one or more push motors are configured to push one or more pushing movers of a robotically controlled endoscopic camera. In certain embodiments, actuating can include actuating five push motors to provide three degrees-of-freedom (DOF).

The method can further include actuating a first instrument controller configured to steer a first attachable robotically controlled medical device. The method can further include actuating a second instrument controller configured to steer a second attachable robotically controlled medical device.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
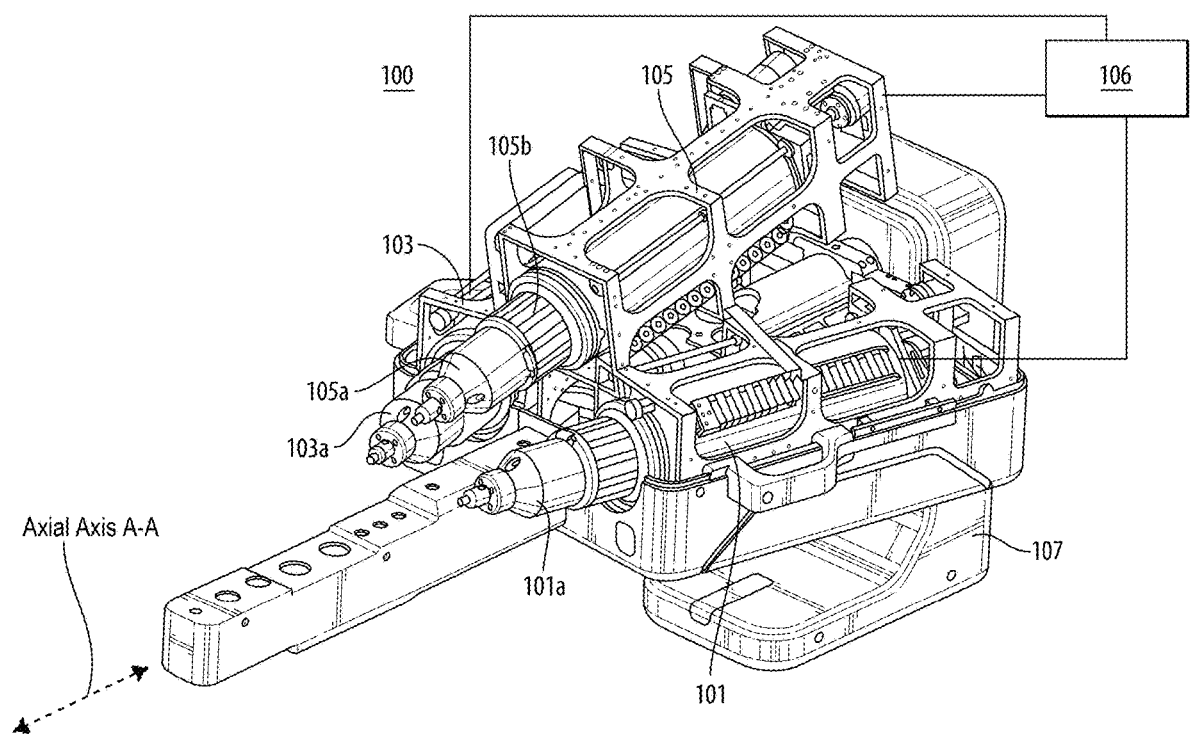
FIG. 1 is a perspective view of an embodiment of a system in accordance with this disclosure, shown having steering adapters attached to each instrument controller and the camera controller.

Reference will now be made to the drawings wherein like reference numerals identify similar structural features or aspects of the subject disclosure. For purposes of explanation and illustration, and not limitation, an illustrative view of an embodiment of an arrangement in accordance with the disclosure is shown in FIG. 1 and is designated generally by reference character 100. Other embodiments and/or aspects of this disclosure are shown in FIGS. 2-10.

Figure 4:
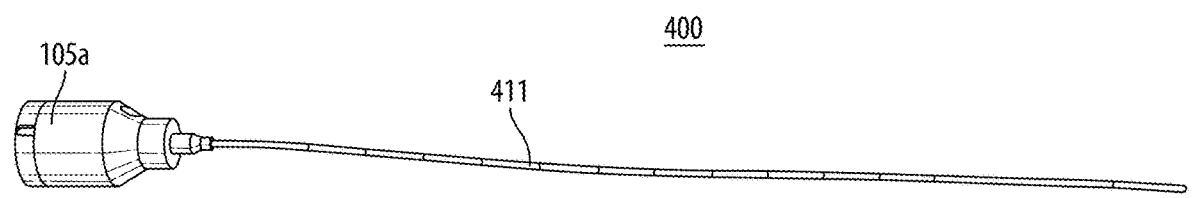
FIG. 4 is an elevation view of an embodiment of a robotically controlled endoscopic camera in accordance with this disclosure.
Figure 5:
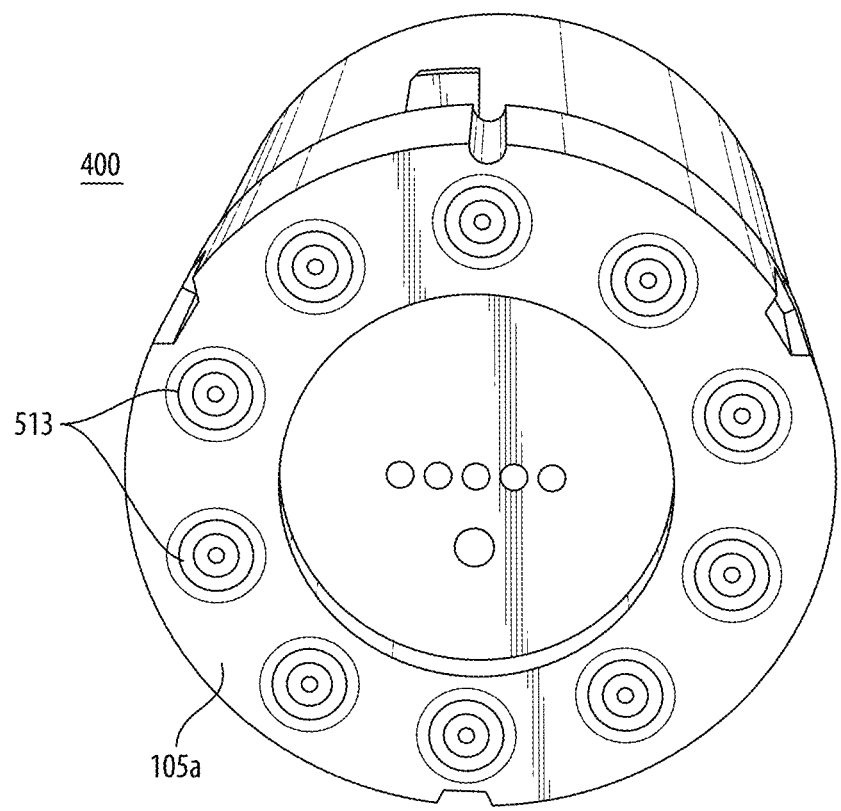
FIG. 5 is a proximal perspective view of the embodiment of FIG. 4, showing the steering adapter of the robotically controlled endoscopic camera.

In accordance with at least one aspect of this disclosure, a controller system 100 for a robotic surgical system can include a first instrument controller 101 comprising a first plurality of motors (not shown) configured to steer a first attachable robotically controlled medical device (not shown except for steering adapter 101a), a second instrument controller 103 comprising a second plurality of motors (not shown) configured to steer a second attachable robotically controlled medical device (not shown except for steering adapter 103a). The system 100 can also include a camera controller 105 comprising a plurality of motors (not shown) and configured to steer an attachable robotically controlled endoscopic camera (e.g., as shown in FIGS. 4 and 5, steering adapter 105a shown in FIGS. 1 and 2).

Embodiments of a camera controller 105 (and/or any other suitable controllers, e.g., controllers 101, 103) can be controlled by a suitable control module 106. The control module 106 can include any suitable hardware and/or software module(s) to operate the motors of the camera controller 105 to cause steering of the camera as a function of user inputs (e.g., at a user console having one or more control inputs), for example.

The first instrument controller 101 and second instrument controller 103 can be the same or similar to the device disclosed in U.S. patent application Ser. No. 16/495,038 (e.g., see FIGS. 17-20 of U.S. patent application Ser. No. 16/495,038), previously incorporated by reference. The steering adapters disclosed herein can be the same or similar to the device disclosed in U.S. patent application Ser. No. 16/495,038 (e.g., see FIGS. 15, 16, 19, and 20 of U.S. patent application Ser. No. 16/495,038).

The controllers 101, 103, 105 can all be mounted to a positioning system 107 (e.g., mounted on a patient cart, not shown) to be moved together relative to a fixed point (e.g., a patient cart). In certain embodiments, each controller 101, 103, 105 can be angled 12 degrees from the axial axis as shown. For example, the camera controller 105 can be angled vertically 12 degrees downward, and the instrument controllers 101, 103 can be angled 12 degrees inward laterally. In such a case, an axial axis of each controller 101, 103, 105 can intersect an axial axis A-A or parallel line (e.g., as shown in FIG. 1) at an angle of 12 degrees.

Figure 2:
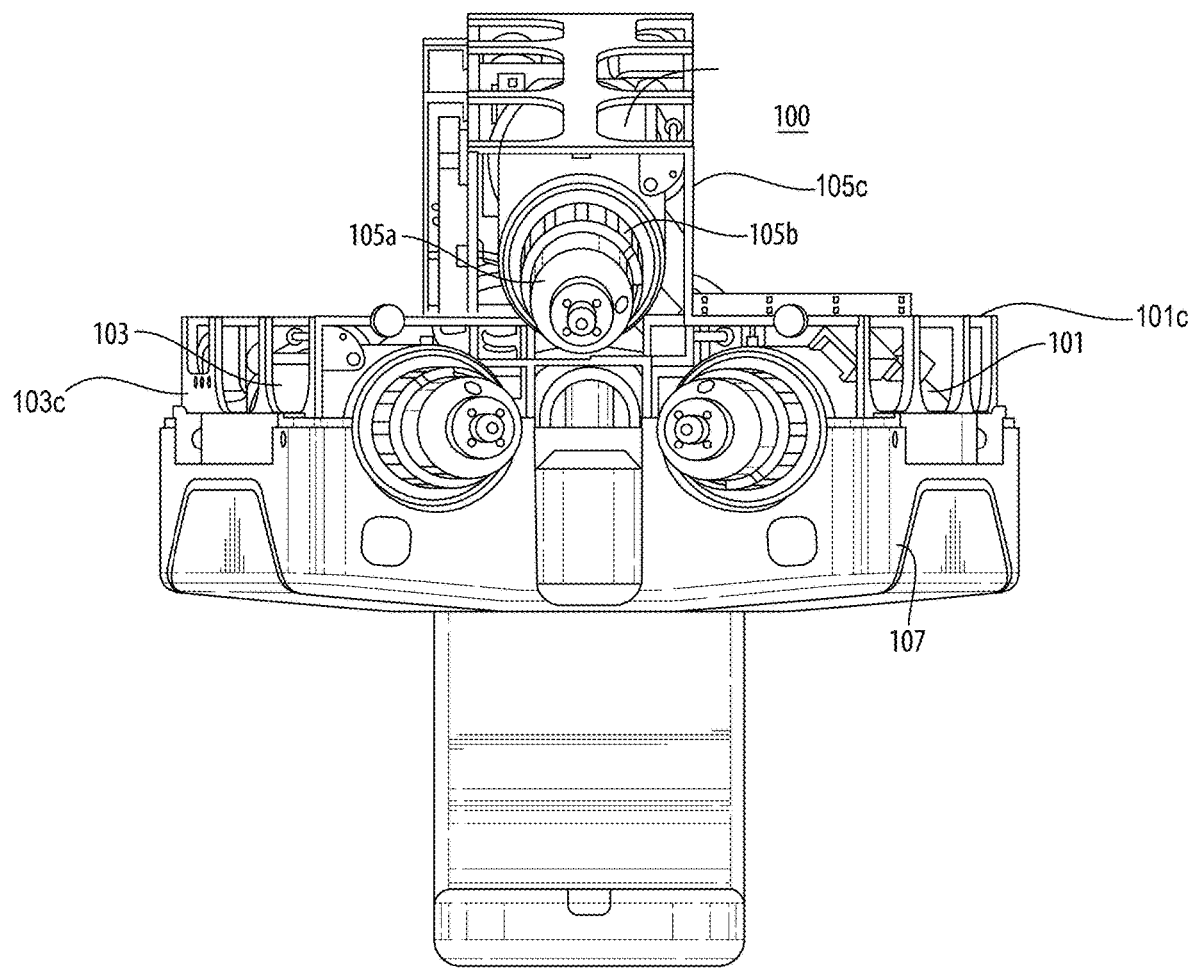
FIG. 2 is an elevation view of the embodiment of FIG. 1.

The camera controller 105 can include a hub attachment interface 105b configured to connect to a steering adapter 105a of a robotically controlled endoscopic camera (e.g., camera 400 of FIGS. 4 and 5). As shown, the camera controller 105 can be positioned above the first and second instrument controllers 101, 103. The camera controller 105 can also be positioned between the first and second instrument controllers 101, 103 symmetrically. In certain embodiments, the camera controller 105 can be positioned such that the camera controller 105 and the first and second instrument controllers 101, 103 form a triangle/pyramidal shape (e.g., as shown in the view of FIG. 2).

The camera controller 105 can include one or more motors (not shown). In certain embodiments, the camera controller 105 can include five motors to provide three degrees-of-freedom (DOF). In certain embodiments, the three DOF can include two DOF for bending and one DOF for axial translation. In certain embodiments, the camera controller 105 may include four motors to provide two degrees of freedom (e.g., bending at two joints) and the positioning assembly 107 can provide an axial translation degree of freedom. However, any suitable number of motors and/or degrees of freedom are contemplated herein. For example, the camera controller 105 can include four motors configured to control two joints (e.g., to form a cobra shape).

Figure 3:
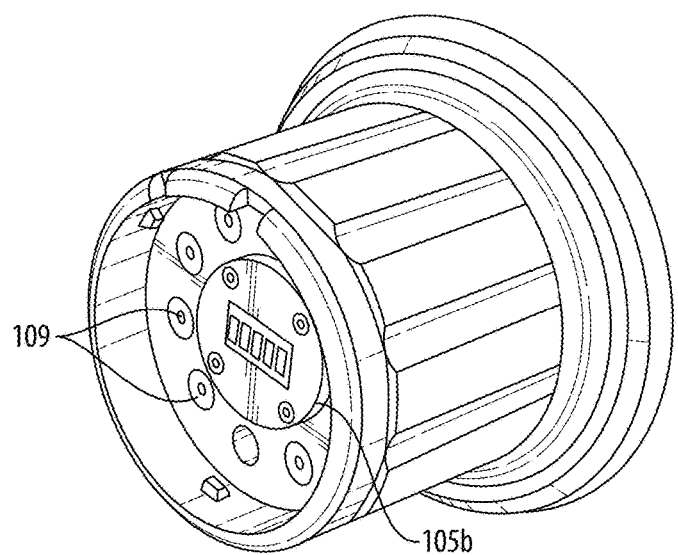
FIG. 3 is a perspective view of an embodiment of a hub adapter of the embodiment of FIG. 1, shown without an endoscopic camera steering adapter attached.

As shown in FIG. 3, the camera controller 105 can include pushing actuators 109 only. Any suitable type of actuators is contemplated herein. Pushing actuators 109 can allow swift attachment of a robotically controlled endoscopic camera 400 as no latches or other connection for the actuators 109 is required.

In certain embodiments, the system 100 can include the robotically controlled endoscopic camera 400. The endoscopic camera 400 can include a steering adapter 105a configured to receive pushing actuation of pushing actuators 109 of the camera controller 105. The steering adapter 105a can be configured to convert pushing actuation from the pushing actuators 109 to pulling actuation to pull steering cables (not shown, e.g., extending within shaft 411) of the robotically controlled endoscopic camera 400. For example, as shown in FIG. 5, the steering adapter 105a can include complementary pushing movers 513 for being pushed by the pushing actuators 109. The camera steering adapter 105a can be the same or similar to the device disclosed in U.S. patent application Ser. No. 16/495,038 (e.g., see FIGS. 15, 16, 19, and 20 of U.S. patent application Ser. No. 16/495,038).

FIG. 1 is a perspective view of an embodiment of a system 100 in accordance with this disclosure, shown having steering adapters 101a, 103a, 105a attached to each instrument controller 101, 103 and the camera controller 105. FIG. 2 is an elevation view of the embodiment of FIG. 1. FIG. 3 is a perspective view of an embodiment of a hub attachment interface 105b (e.g., a drape adapter assembly) of the embodiment of FIG. 1, shown without an endoscopic camera steering adapter 105a attached. FIG. 4 is an elevation view of an embodiment of a robotically controlled endoscopic camera 400 in accordance with this disclosure. FIG. 5 is a proximal perspective view of the embodiment of FIG. 4, showing the steering adapter 105a of the robotically controlled endoscopic camera 400.

Figure 6:
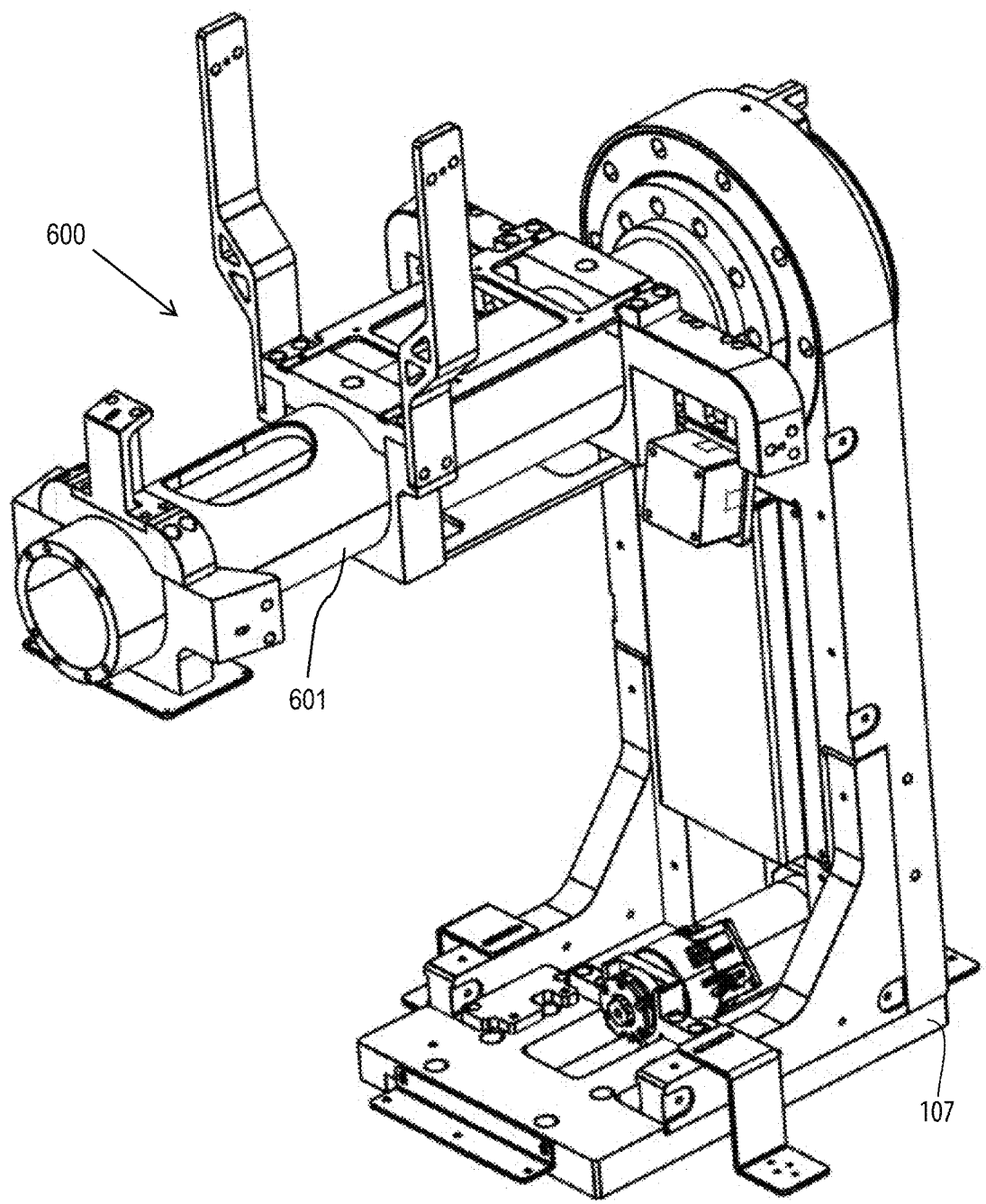
FIG. 6 is a perspective view of an embodiment of a frame of the embodiment of FIG. 1, shown attached to a portion of a positioning assembly to be rotated and/or translated by the positioning assembly.
Figure 7:
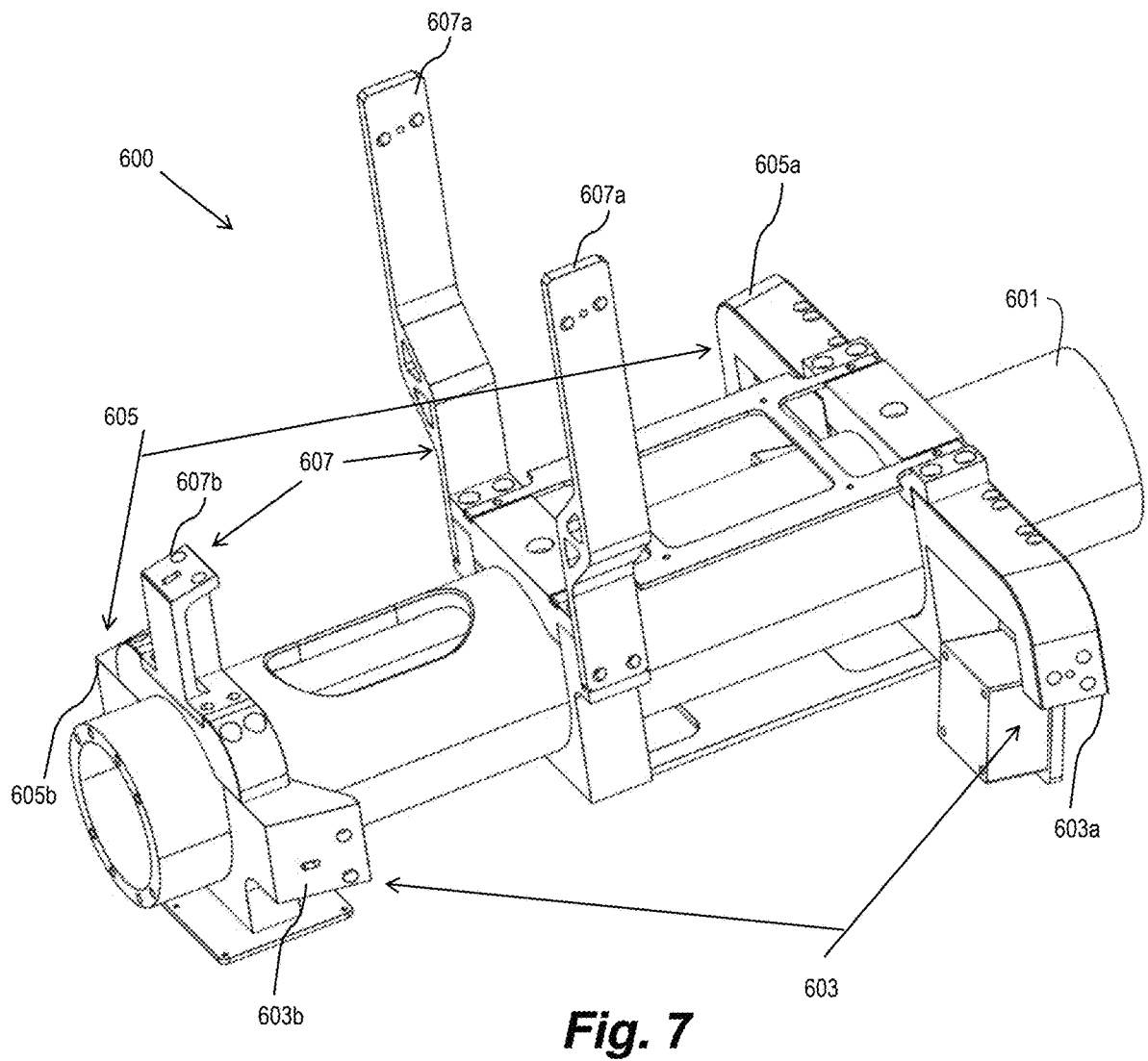
FIG. 7 is a perspective view of the frame of FIG. 6, shown in isolation of the positioning assembly.

Referring to FIGS. 6-10, an embodiment of a frame 600 is shown. FIG. 6 shows the frame attached to a portion of a positioning system 107 to be rotated and/or translated by the positioning system 107. FIGS. 7-10 show the frame 600 in isolation of the positioning system (mounted to a shaft 601 which connects to the positioning system 107 to be rotated). The frame 600 can include a first lateral mount portion 603, a second lateral mount portion 605, and a vertical mount portion 607.

Figure 8:
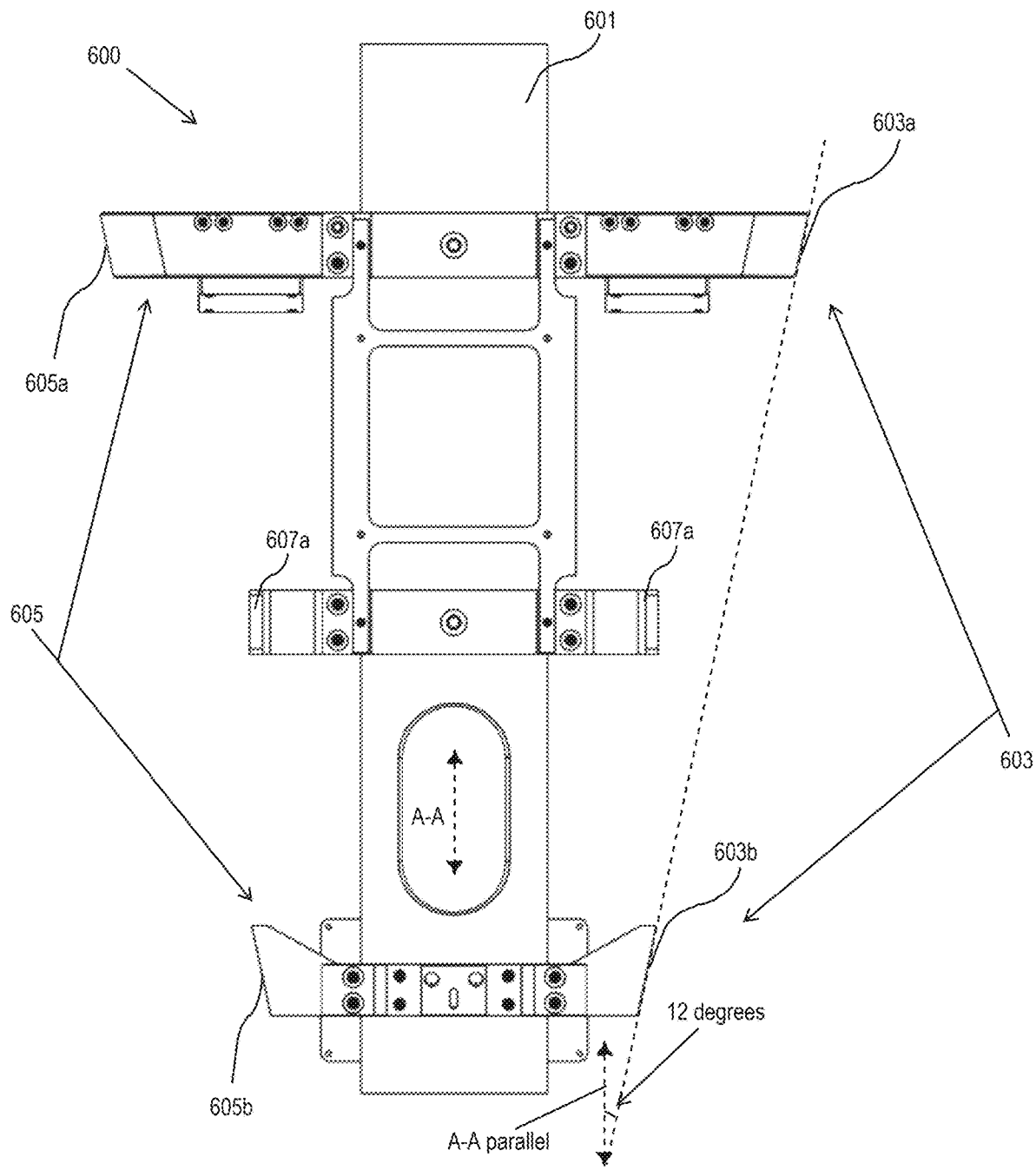
FIG. 8 is a plan view of the frame of FIG. 7.

Each of the first and second lateral mount portions 603, 605 can include a proximal bracket 603a, 605a (which can be formed together or be multiple pieces), and a distal bracket 603b, 605b (which can be formed together or be multiple pieces). Each pair of proximal brackets 603a, 605a and distal brackets 603b, 605b can form two points on a plane. For example, an outer surface of each of the proximal brackets 603a, 605a and distal brackets 603b, 605b can be formed to be angled, e.g., as shown in FIG. 8. The proximal brackets 603a, 605a can extend further outward from a centerline (e.g., from the shaft 601) than the distal brackets 603b, 605b as shown, for example, to form the angled plane. In certain embodiments, each outer surface of the brackets 603a, b, 605a, b, can be angled 12 degrees relative to the axis A-A such that the planes formed are angled accordingly.

The frame 600 can include a first lateral mount portion 603, a second lateral mount portion 605, and a vertical mount portion 607. The first instrument controller 101 can be mounted to the proximal bracket 603a and the distal bracket 603b to be angled relative to the axis A-A (or parallel line), e.g., by 12 degrees or other suitable angle. The second instrument controller 103 can be mounted to the proximal bracket 605a and the distal bracket 605b to be angled relative to the axis A-A (or parallel line), e.g., by 12 degrees or other suitable angles.

Figure 9:
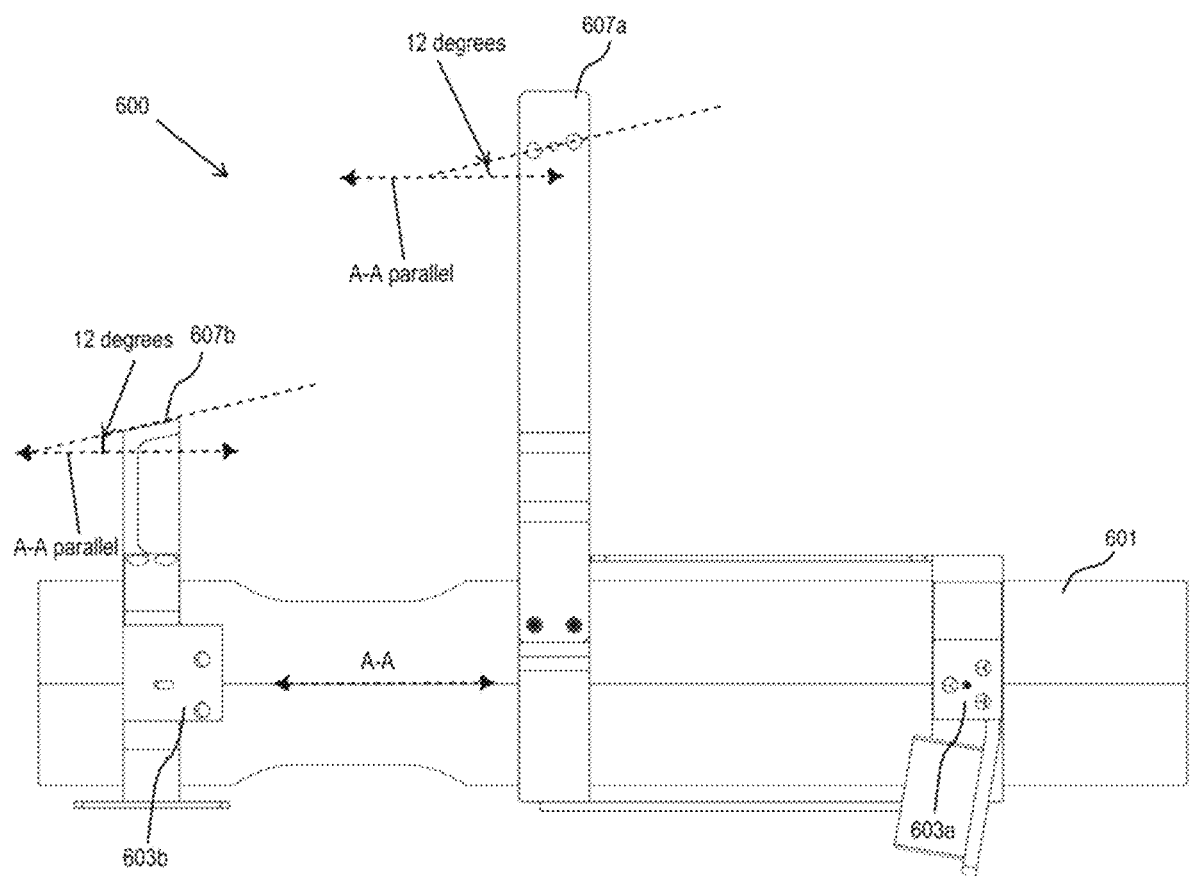
FIG. 9 is a side elevation of the embodiment of FIG. 7.
Figure 10:
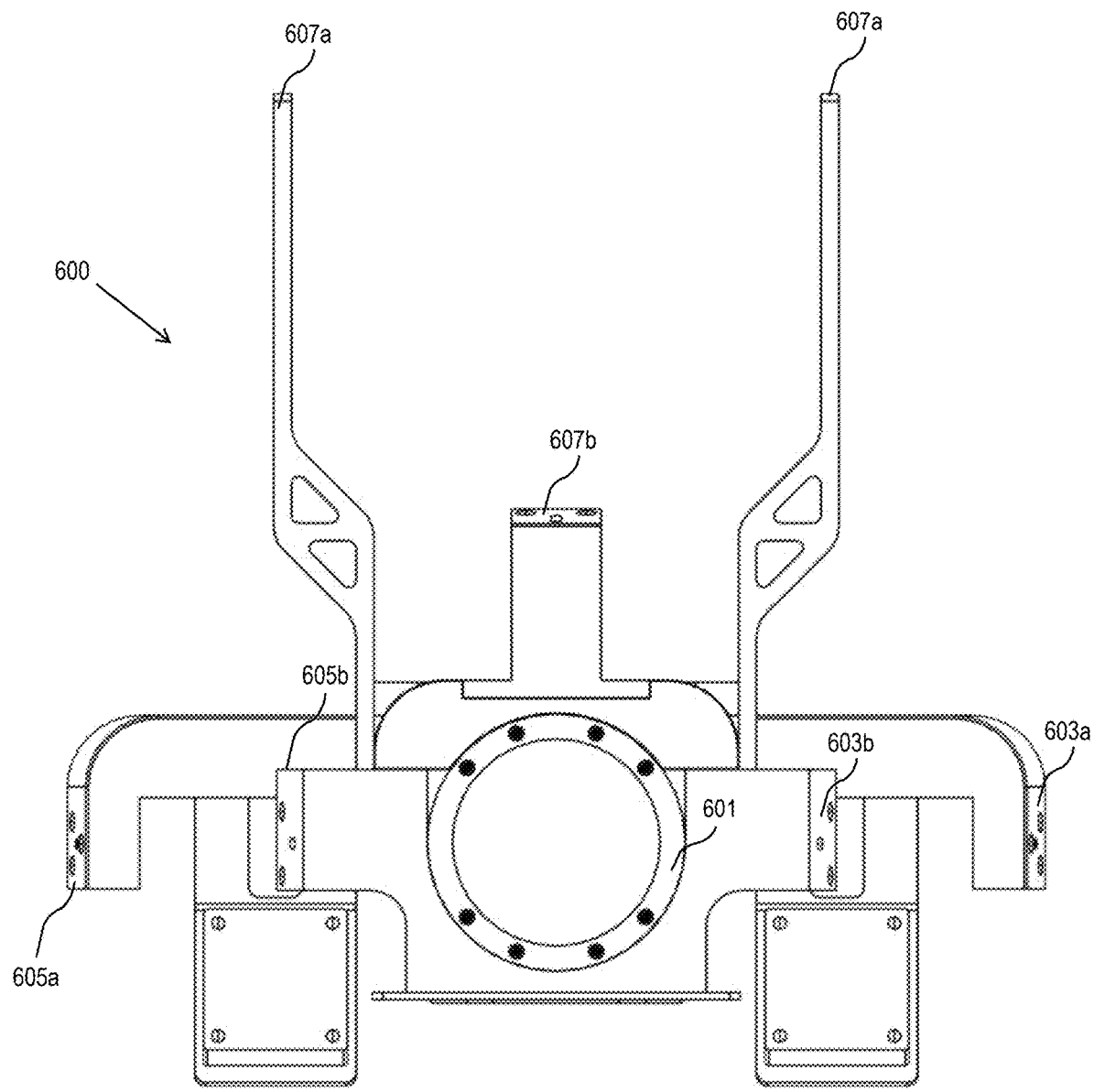
FIG. 10 is a front elevation of the embodiment of FIG. 7.

The vertical mount portion 607 can include a proximal brackets 607a configured and a distal braclet 607b. The camera controller 105 can be mounted to the proximal brackets 607a and the distal bracket 607b to be angled relative to the axis A-A (or parallel line), e.g., by 12 degrees or other suitable angles. The outer surface of the distal bracket 607b can be angled downward (e.g., 12 degrees as shown in FIG. 9). For example, the proximal brackets 607a can form a fork shape configured to contain the camera controller 105. The proximal brackets 607a can also include one or more fastener holes aligned at the same angle as the outer surface of the distal bracket 607b (e.g., 12 degrees as shown). In this regard, matching holes on the camera controller 105 can aid alignment of the camera controller 105 in additional to the distal bracket 607b.

As shown, e.g., in FIG. 1, each controller 101, 103, 105 can include a housing 101c, 103c, 105c configured to mount to the brackets 603a, 603b, 605a, 605b, 607a, 607b, respectively. As shown, the housings 101c, 103c, 105c can have a substantially planar shape, e.g., a square shape, to flush mount to the respective brackets 603a, 603b, 605a, 605b, 607a, 607b. The housings 101c, 103c, 105c can be fastened to the respective brackets 603a, 603b, 605a, 605b, 607a, 607b in any suitable manner (e.g., via one or more screws or bolts).

As shown, the frame 600 can be configured to have or be mounted to a shaft 601 that is part of or connected to the positioning system 107. The tube 107 can be rotated about axis A-A, for example, to provide selective rotation to all mounted controllers 101, 103, 105 simultaneously. The portion of the positioning system 107 shown in FIG. 6 can be configured to slide axially along the axis A-A to provide selective translation to all of the mounted controllers 101, 103, 105 simultaneously. Any other suitable structure and/or positioning system to accommodate the frame 600 and/or the controllers 101, 103, 105 disclosed herein is contemplated herein. Embodiments can allow a triangulation of medical instruments (e.g., having two end effectors and a camera) attached to the controllers 101, 103, 105 into a single overtube assembly (e.g., which extends substantially axially along axis A-A from the system 107) to pass the medical instruments to a distal location within a patient.

In accordance with at least one aspect of this disclosure, a robotic surgical system can include a controller system. The controller system can include any suitable controller system disclosed herein, e.g., as described above.

In accordance with at least one aspect of this disclosure, a non-transitory computer readable medium can include computer executable instruction configured to cause a computer to perform a method. The method can include receiving camera control inputs from a user input device of a robotic surgical system, correlating the camera control inputs to a motor control to provide an associated instrument movement of a medical device, and actuating one or more push motors of a camera controller based with the motor control such that the one or more push motors are configured to push one or more pushing movers of a robotically controlled endoscopic camera. In certain embodiments, actuating can include actuating one or more (e.g., five) push motors to provide three degrees-of-freedom (DOF).

The method can further include actuating a first instrument controller configured to steer a first attachable robotically controlled medical device. The method can further include actuating a second instrument controller configured to steer a second attachable robotically controlled medical device.

Embodiments can include three controllers positioned with a symmetric pattern to control robotic instruments and a videoscope. The videoscope controller can have the same configuration as an instrument controller, and the system can be designed to be retrofit onto existing patient cart systems without any or meaningful change to the patient cart/console.

Any module(s) disclosed herein can include any suitable hardware and/or software module(s) configured to perform any suitable function(s) (e.g., as disclosed herein, e.g., as described above). As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A controller system for a robotic surgical system, comprising:
   a first instrument controller comprising a first plurality of motors configured to steer a first attachable robotically controlled medical device;

a second instrument controller comprising a second plurality of motors configured to steer a second attachable robotically controlled medical device;

a camera controller comprising a plurality of motors and configured to steer an attachable robotically controlled endoscopic camera, wherein the camera controller includes a hub attachment interface adapted and configured to connect to a steering adapter of the attachable robotically controlled endoscopic camera, wherein the camera controller is positioned above the first and second instrument controllers, wherein the camera controller is positioned symmetrically with respect to the first and second instrument controllers, wherein the camera controller includes one or more motors to provide three degrees-of-freedom (DOF) to the attachable robotically controlled endoscopic camera, including two DOF for bending and one DOF for axial translation, and wherein the camera controller includes one or more linear pushing actuators; and the attachable robotically controlled endoscopic camera, wherein the steering adapter is configured to receive pushing actuation of the one or more linear pushing actuators of the camera controller, wherein the steering adapter is configured to convert pushing actuation from the one or more linear pushing actuators to pulling actuation to pull steering cables of the attachable robotically controlled endoscopic camera.

2. A robotic surgical system, comprising:

a controller system, comprising:
- a first instrument controller comprising a first plurality of motors configured to steer a first attachable robotically controlled medical device;
- a second instrument controller comprising a second plurality of motors configured to steer a second attachable robotically controlled medical device; and
- a camera controller comprising a plurality of motors and configured to steer an attachable robotically controlled endoscopic camera, wherein the camera controller includes a hub attachment interface adapted and configured to connect to a steering adapter of the attachable robotically controlled endoscopic camera, wherein the camera controller is positioned above the first and second instrument controllers, wherein the camera controller is positioned symmetrically with respect to the first and second instrument controllers, wherein the camera controller includes one or more motors to provide three degrees-of-freedom (DOF) to the attachable robotically controlled endoscopic camera, including two DOF for bending and one DOF for axial translation, and wherein the camera controller includes one or more linear pushing actuators; and the attachable robotically controlled endoscopic camera, wherein the steering adapter is configured to receive pushing actuation of the one or more linear pushing actuators of the camera controller, wherein the steering adapter is configured to convert pushing actuation from the one or more linear pushing actuators to pulling actuation to pull steering cables of the attachable robotically controlled endoscopic camera.

3. A non-transitory computer-readable medium, comprising computer executable instruction configured to cause a computer to perform a method, the method comprising:
- receiving camera control inputs from a user input device of a robotic surgical system;
- correlating the camera control inputs to a motor control to provide an associated instrument movement of a robotically controlled endoscopic camera; and
- actuating one or more push motors of a camera controller based on the motor control so that the one or more push motors are configured to push one or more linear pushing movers of the robotically controlled endoscopic camera,
- wherein the robotically controlled endoscopic camera includes a steering adapter configured to receive pushing actuation of the one or more linear pushing movers of the camera controller, wherein the steering adapter is configured to convert pushing actuation from the one or more linear pushing movers to pulling actuation to pull steering cables of the robotically controlled endoscopic camera.

4. The non-transitory computer readable medium of claim 3, wherein actuating includes actuating the one or more push motors to provide three degrees-of-freedom (DOF) to the robotically controlled endoscopic camera.

5. The non-transitory computer readable medium of claim 3, wherein the method further includes actuating a first instrument controller configured to steer a first attachable robotically controlled medical device.

6. The non-transitory computer readable medium of claim 3, wherein the method further includes actuating a second instrument controller configured to steer a second attachable robotically controlled medical device.

* * * * *